US011498871B2

(12) United States Patent
Bost et al.

(10) Patent No.: US 11,498,871 B2
(45) Date of Patent: Nov. 15, 2022

(54) ULTRA-LIGHT MINERAL FOAM

(71) Applicant: HOLCIM TECHNOLOGY LTD, Jona (CH)

(72) Inventors: Pascal Bost, Saint-Quentin-Fallavier (FR); Serge Sabio, Saint-Quentin-Fallavier (FR); Christine Chaumilliat, Saint-Quentin-Fallavier (FR); Hélène Lombois-Burger, Saint-Quentin-Fallavier (FR)

(73) Assignee: HOLCIM TECHNOLOGY LTD, Zug (CH)

( * ) Notice: Subject to any disclaimer, the term of this patent is extended or adjusted under 35 U.S.C. 154(b) by 992 days.

(21) Appl. No.: 15/780,783

(22) PCT Filed: Dec. 5, 2016

(86) PCT No.: PCT/IB2016/001720
§ 371 (c)(1),
(2) Date: Jun. 1, 2018

(87) PCT Pub. No.: WO2017/093796
PCT Pub. Date: Jun. 8, 2017

(65) Prior Publication Data
US 2020/0247722 A1 Aug. 6, 2020

(30) Foreign Application Priority Data
Dec. 4, 2015 (EP) .................................... 15306941

(51) Int. Cl.
| *B28B 1/14* | (2006.01) |
| *C04B 22/00* | (2006.01) |
| *C04B 28/04* | (2006.01) |
| *C04B 38/10* | (2006.01) |
| *C04B 40/00* | (2006.01) |
| *C04B 14/04* | (2006.01) |
| *C04B 103/30* | (2006.01) |
| *C04B 103/32* | (2006.01) |
| *C04B 111/40* | (2006.01) |
| *C04B 111/52* | (2006.01) |

(52) U.S. Cl.
CPC ............... *C04B 28/04* (2013.01); *B28B 1/14* (2013.01); *C04B 14/04* (2013.01); *C04B 22/00863* (2021.05); *C04B 38/10* (2013.01); *C04B 40/0046* (2013.01); *C04B 2103/30* (2013.01); *C04B 2103/32* (2013.01); *C04B 2111/40* (2013.01); *C04B 2111/52* (2013.01); *C04B 2201/30* (2013.01)

(58) Field of Classification Search
CPC ..... C04B 38/10; C04B 22/0086; C04B 28/04; C04B 40/0046; C04B 2103/30; C04B 2103/32; C04B 2111/40; C04B 2111/52; C04B 2201/30; C04B 14/04; C04B 14/28; C04B 18/06; C04B 22/08; C04B 24/00; C04B 11/005; C04B 14/043; C04B 40/0028; C04B 22/00863; C04B 22/00; C04B 40/00; B28B 1/14; B28B 1/50; C08J 9/00; E04B 1/78; E04B 1/76
See application file for complete search history.

(56) References Cited

U.S. PATENT DOCUMENTS

| 5,696,174 A | 12/1997 | Chao et al. |
| 6,443,258 B1* | 9/2002 | Putt .......................... B28C 5/381 181/294 |
| 2012/0152540 A1* | 6/2012 | Patil ..................... C04B 28/188 166/293 |
| 2012/0286190 A1* | 11/2012 | Prat .......................... C04B 38/02 252/62 |

FOREIGN PATENT DOCUMENTS

| EP | 1 088 800 A2 | 4/2001 |
| EP | 2 842 921 A1 | 3/2015 |
| RU | 2212389 C1 | 9/2003 |
| RU | 2478469 C1 | 4/2013 |
| SU | 234373 A | 4/1969 |
| WO | WO 2011/086333 A2 | 7/2011 |
| WO | WO 2013/150148 A1 | 10/2013 |
| WO | WO-2013150148 A1 * | 10/2013 ............. C04B 38/10 |

OTHER PUBLICATIONS

Tomasz Zdeb, Influence of the Physicochemical Properties of Portland Cement on the Strength of Reactive Powder Concrete, Procedia Engineering,vol. 108, 2015,pp. 419-427, ISSN 1877-7058, doi: 10.1016/j.proeng.2015.06.166. (Year: 2015).*
International Search Report as issued in International Patent Application No. PCT/IB2016/001720, dated Feb. 1, 2017.
Office Action as issued in Russian Patent Application No. 2018124200, dated Dec. 25, 2019.

* cited by examiner

*Primary Examiner* — Kevin E Yoon
*Assistant Examiner* — Marites A Guino-O Uzzle
(74) *Attorney, Agent, or Firm* — Pillsbury Winthrop Shaw Pittman LLP

(57) ABSTRACT

A process for the production of a mineral foam includes separately preparing a slurry of cement and an aqueous foam, wherein the cement slurry includes water and Portland cement as well as calcium silicate hydrate crystallization seeds; contacting the slurry of cement with the aqueous foam to obtain a slurry of foamed cement; and casting the slurry of foamed cement and leave it to set.

21 Claims, No Drawings

ULTRA-LIGHT MINERAL FOAM

CROSS-REFERENCE TO RELATED APPLICATIONS

This application is the U.S. National Stage of International Application Serial No. PCT/IB2016/001720, filed Dec. 5, 2016, which in turn claims priority to European Application No. 15 306 941.4, filed Dec. 4, 2015. The contents of all of these applications are incorporated herein by reference in their entirety.

The present invention refers to an ultra-light mineral foam with a base of Portland cement, to a process for production of such mineral foams and to elements of construction comprising these foams.

Generally, a mineral foam, in particular a cement foam, is very advantageous for many applications due to its properties, such as its thermal insulation properties, its acoustic insulation properties, its durability, its resistance to fire and its easy implementation.

A mineral foam is a material in the form of a foam. This material is generally more lightweight than typical concrete due to its pores or empty spaces. These pores or empty spaces are due to the presence of air in the mineral foam and they may be in the form of bubbles. An ultra-light foam is understood to be a foam generally having a density in its dry state of between 20 and 300 $kg/m^3$.

When a mineral foam is poured into an element, the mineral foam may collapse due to a lack of stability in the mineral foam, for example during its placing or before it sets. Such problems may be due to coalescence phenomena, to Ostwald ripening phenomena, to hydrostatic pressure or to draining phenomena, the latter being greater in particular in case of elements of important height.

The difficulty in the production of mineral foams is therefore to produce a stable mineral foam which reduces these collapse problems. However, known processes for providing sufficiently stable mineral foams require cement compositions that comprise numerous additives and that are difficult and costly to realize.

In US 5,696,1741 the simultaneous use of (i) cationic and (ii) anionic components has already been proposed for obtaining mineral foams. Such cementitious foams comprise ammonium stearates as the anionic component and a cationic component denominated Arquad T.

The application WO 2013/150148 describes mineral foams based on cement comprising different admixtures. These foams may comprise calcium aluminate cement in order to allow a rapid setting, or fine mineral components in addition to Portland cement. Nevertheless, the lowest density achieved with this process is mostly limited to 100 $kg/m^3$.

The patent application WO 2011/086333 describes mineral foams based on aluminous cements. The high reactivity of these cements certainly allows the formation of stable and homogenous mineral foams, but the high costs and the high reactivity result in that this invention is in very many cases difficult to use by the user.

In order to meet user requirements, it has become necessary to find a formulation for an ultra-light and highly stable mineral foam, the realisation of which is simple and incurs little cost.

Further, the problem which the invention intends to solve is to find a formulation for a stable and ultra-light mineral foam, which does not collapse when the foam is poured vertically and the realisation of which is relatively effortless and incurs little cost.

The invention relates to a process for the production of a mineral foam comprising the following steps:
(i) separately preparing a slurry of cement and an aqueous foam, wherein the cement slurry comprises water (W) and Portland cement (C) as well as calcium silicate hydrate (CSH) crystallization seeds;
(ii) contacting the slurry of cement with the aqueous foam to obtain a slurry of foamed cement;
(iii) casting the slurry of foamed cement and leave it to set.

According to another feature of the invention, a mineral foam is provided that is obtained or obtainable by the inventive process. The foam according to the invention may be used as construction material or insulating material. For example, the mineral foam may be poured between two panels of gypsum boards, or between two brick walls or between two load-bearing concrete walls.

The invention also relates to elements of construction comprising a mineral foam according to the invention.

The process provided by the present invention has one or more of the following characteristics:
the process is universal, which is to say it makes it possible to produce a stable mineral foam from any type of cement;
the process is easy to implement;
the process can be easily transported to any site or jobsite;
the process makes it possible to implement a mineral foam in a continuous manner. It is therefore possible to produce the mineral foam continuously and to pour this foam without interruption.

The process for production of a mineral foam according to the invention may be used in a discontinuous or continuous system.

The mineral foam provided by the instant invention has one or more of the following characteristics:
the mineral foam according to the invention has excellent stability properties. In particular, it is possible to obtain foam that does not collapse or only very slightly when the foam is poured vertically or from a considerable height. For example, the mineral foam according to the invention does not collapse or only very slightly when it is poured vertically from a height greater than or equal to 2 metres;
the mineral foam according to the invention has excellent thermal properties, and in particular very low thermal conductivity. It is highly desirable to reduce thermal conductivity in construction materials since this makes it possible to obtain savings of heating energy for residence and office buildings. Furthermore, this decrease makes it possible to reduce thermal bridges, in particular in the construction of buildings several stories high and designed using indoor thermal insulation. In particular thermal bridges are reduced on the intermediary floors.

Cement is a hydraulic binder comprising at least 50 wt.-% of CaO and of $SiO_2$. Cement may therefore contain other components in addition to CaO and $SO_2$, in particular slag, silica fume, pozzolans (natural and calcined), fly ash (siliceous and calcic) and/or limestone.

Portland cement as used in the invention may be any type of Portland cement, whatever its chemical composition is, and in particular whatever its alkaline content is. Therefore, one of the advantages of the invention is not having to select a specific type of Portland cement. Advantageously, the Portland cement used in the invention is selected from the cements readily available on the market.

The suitable cement used in step (i) of the invention is preferably the cements described according to the European NF EN 197-1 Standard of April 2012 or mixtures thereof, preferably cement of the types CEM I, CEM II, CEM III, CEM IV or CEM V.

The water/cement ratio (wt/wt ratio) of the cement slurry prepared in step (i) is preferably from 0.25 to 0.5, more preferably from 0.28 to 0.35, in particular 0.29. The water/cement ratio may vary, for example due to the water demand of the mineral particles when these are used. The water/cement ratio is defined as being the ratio by mass of the quantity of water (W) to the dry Portland cement mass (C).

The cement slurry prepared in step (i) may comprise a water reducer, such as a plasticiser or a super-plasticiser. A water reducer makes it possible to reduce the amount of mixing water for a given workability by typically 10-15%. By way of example of water reducers, mention may be made of lignosulphonates, hydroxycarboxylic acids, carbohydrates, and other specific organic compounds, for example glycerol, polyvinyl alcohol, sodium alumino-methyl-siliconate, sulfanilic acid and casein as described in the Concrete Admixtures Handbook, Properties Science and Technology, V. S. Ramachandran, Noyes Publications, 1984.

Super-plasticisers belong to a new class of water reducers and are capable of reducing water contents of mixing water, for a given workability, by approximately 30% by mass. By way of example of a super-plasticiser, the PCP super-plasticisers without an anti-foaming agent may be noted. The term "PCP" or "polyoxy polycarboxylate" is to be understood according to the present invention as a copolymer of acrylic acids or methacrylic acids and their esters of polyoxy ethylene (POE).

Preferably, the cement slurry comprises 0.05 to 1%, more preferably 0.05 to 0.5% of a water reducer, a plasticiser or a super-plasticiser, percentage expressed by mass relative to the dry cement mass.

Preferably, the cement slurry does not comprise an anti-foaming agent, or any agent having the property of destabilizing an air/liquid emulsion. Certain commercial super-plasticisers may contain anti-foaming agents and consequently these super-plasticisers are not suitable for the cement slurry used to produce the mineral foam according to the invention.

Preferably, the cement slurry used to produce the mineral foam according to the invention comprises 0.05 to 2.5 wt.-% of an accelerator, expressed as dry mass relative to dry cement mass.

According to an embodiment of the invention, other additives may be added to the cement slurry or the aqueous foam. Such additives may be thickening agents, viscosifying agents, air entraining agents, setting retarders, coloured pigments, hollow glass beads, film forming agents, hydrophobic agents or de-polluting agents (for example zeolites or titanium dioxide), latex, organic or mineral fibres, mineral additions or their mixtures. Preferably, the additives do not comprise any defoaming agents.

The expression "thickening agent", is generally to be understood as any compound making it possible to maintain the heterogeneous physical phases in equilibrium or facilitate this equilibrium. The suitable thickening agents are preferably gums, cellulose or its derivatives, for example cellulose ethers or carboxy methyl cellulose, starch or its derivatives, gelatine, agar, carrageenans or bentonite clays.

According to an embodiment of the invention, the cement slurry used to produce the mineral foam according to the invention may further comprise mineral particles. Preferably, the cement slurry used to produce the mineral foam according to the invention may comprise 0 to 50% of mineral particles, more preferably from 5 to 40%, most preferably from 5 to 35%, the percentages being expressed by mass relative to the mass of slurry of foamed cement.

The suitable mineral particles are selected from calcium carbonate, silica, ground glass, solid or hollow glass beads, glass granules, expanded glass powders, silica aerogels, silica fume, slags, ground sedimentary siliceous sands, fly ash or pozzolanic materials or mixtures thereof.

The mineral particles used according to the invention may be slags (for example, as defined in the European NF EN 197-1 Standard of April 2012, paragraph 5.2.2), pozzolanic materials (for example as defined in the European NF EN 197-1 Standard of April 2012, paragraph 5.2.3), fly ash (for example, as described in the European NF EN 197-1 Standard of April 2012, paragraph 5.2.4), calcined schists (for example, as described in the European NF EN 197-1 Standard of April 2012, paragraph 5.2.5), material containing calcium carbonate, for example limestone (for example, as defined in the European NF EN 197-1 Standard paragraph 5.2.6), silica fume (for example, as defined in the European NF EN 197-1 Standard of April 2012, paragraph 5.2.7), siliceous additions (for example, as defined in the "Concrete" NF P 18-509 Standard), metakaolin or mixtures thereof.

Fly ash is generally pulverulent particles comprised in fume from thermal power plants which are fed with coal. Fly ash is generally recovered by electrostatic or mechanical precipitation.

Slags are generally obtained by rapid cooling of molten slag resulting from melting of iron ore in a blast furnace.

Silica fume may be a material obtained by the reduction of very pure quality quartz by the coal in electric arc furnaces used for the production of silicon and alloys of ferrosilicon. Silica fume is generally formed of spherical particles comprising at least 85% by mass of amorphous silica.

The pozzolanic materials may be natural siliceous and/or silico-aluminous materials or a combination thereof. Among the pozzolanic materials, natural pozzolans can be mentioned, which are generally materials of volcanic origin or sedimentary rocks, and natural calcined pozzolans, which are materials of volcanic origin, clays, shale or thermally-activated sedimentary rocks.

According to the invention, CSH crystallization seeds are contained in the cement slurry prepared in step (i). Preferably, the CSH crystallization seeds comprise calcium silicate hydrate particles. Preferably, the CSH crystallization seeds are present in the form of an aqueous suspension.

The CSH crystallisation seeds may be present in an amount of 0.5-7% in dry CSH by weight of the dry Portland cement, preferably 0.5-5% in dry CSH by weight of the dry Portland cement, more preferably 0.7-3% in dry CSH by weight of the dry Portland cement.

Preferably the CSH crystallization seeds have a D90 of less than 5 μm.

It has been found that the addition of CSH crystallization seeds to the cement slurry has a stabilizing effect on Portland cement based mineral foams and thus allows the production of ultra-low density mineral foams, whereby the stabilizing effect is independent from the type of Portland cement used. Therefore, the invention allows a broad choice of various Portland cement types.

A further advantage of the invention is that the use of CSH crystallization seeds allows to manufacture a stable foam from Portland cement without the need of adding ultra-fine limestone particles.

Further, it has been observed that the average diameter of the bubbles of the slurry of foamed cement is decreasing when using CSH crystallization seeds in the cement slurry.

Even though the exact mechanism of action of the CSH crystallization seeds in the inventive process has not been completely analysed yet, it is understood that the improved stability of the foam is the results of two phenomena that occur in the mineral foam:
- improved stabilisation of the mineral foam before the cement slurry sets by a Pickering stabilization effect due to the small size of the CSH crystallization seeds;
- improved stabilisation of the mineral foam through the acceleration of the setting of the slurry by the CSH crystallization seeds. CSH crystallization seeds are indeed currently foremost used in concrete applications for their accelerating effect, and the use of accelerators is beneficial to the stability of the foams. Indeed, upon mixing of the cement slurry and the foam, the foam is in a plastic state and must be able to support its own weight until the cement sets.

CSH crystallization seeds have become known as accelerator additives in cementing applications. In particular, the surface of calcium silicate hydrate (CSH) nano-particles added to the cement slurry is used to stimulate the development of calcium silicate hydrate nuclei efficiently.

CSH crystallization seeds can be purchased from BASF under the product name X-Seed®, but as such this product is not suitable for this invention, because it contains defoaming agents.

The CSH crystallization seeds used in this invention may be produced by various methods, such as from the following sources:

1. A laboratory produced batch of diluted CSH seeds by precipitation of CSH from calcium nitrate and sodium silicates:

200 mL of a sodium silicate solution with a solids content of silicate of 40%, 400 mL water and 2 g of a water reducer that does not have any defoaming effects are weighed into a reactor. Then, 200 mL of a 50% solution of a calcium salt, such as a calcium nitrate, is added into the reactor within 30 seconds while stirring at 1200 rpm. An instantaneous reaction is observed and CSH seeds are obtained that are present in a 22% solution.

2. Hydrated cement pastes produced in the laboratory:

The equipment used for the production of a gel of hydrated cement is a glass reactor having a content of approx. 2 L, the water-proof lid thereof being equipped with an electrically driven stirrer. The rotor blade of the stirrer is of the anchor type that allows to stir at the bottom of the reactor in order to prevent the depositing of a sediment.

For the preparation of 1.5 L of a gel of hydrated cement, the following procedure is observed:
- Introduction of 1.5 L of a super-plasticiser (such as 20 g of Mater Glenium ACE456 by BASF) suitable for accelerating the hydration process,
- Controlled stirring at 450 rpm,
- Addition of 200 g of cement (typically CEM I 52.5 R from Port La Nouvelle of LafargeHolcim),
- Stirring at 450 rpm during 48 hours without stopping,
- After 48 hours of stirring, retrieving the obtained solution and storing the same in a suitable canister closed tightly (typically a 2 litres polypropylene canister),
- Allowing the canister to rest during several days (minimum 3 days, preferably 7 days).

The gel of hydrated cement is comprised of free water, various hydration products, among them a gel of calcium silicate hydrate (CSH), portlandite and anhydrides of non hydrated cement. The gel of hydrated cement is used as is and constitutes a solids content of 15-20 wt.-% after loss on ignition at 60° C./72 hours.

3. Sedimentation sludge obtained from fresh concretes or mortars:

Sedimentation sludge is collected from sedimentation tanks that are used in waste water management installations of concrete production facilities. Therefore, such sludge may originate, e.g., from sedimentation tanks of ready mix concrete plants, in which washing water from concrete transportation trucks is collected. The sludge is preferably collected by means of a shovel loader, and preferably from the back of a second tank, because this would contain less sand and finer particles.

The humid sludge is sieved in water at 200 µm and the fraction having a particle size of less than 200 µm is collected and stored in tanks or buckets and sedimentation is allowed. After sedimentation the surface water is removed by suction. A dispersant (super-plasticiser) not having defoaming effects is added to the sediment at an amount of 0.1 wt.-% (dry) of the total dry mass of the sediment, while mixing at high speed (2000 rpm) in a Rayneri Turbotest mixer. The final product has a solids content of 20-30 wt.-% and is mainly composed of CSH seeds.

The formulation of the invention overcomes the technical prejudice according to which the use of various additives is necessary in order to ensure the stability of the mineral foam.

In particular, the mineral foam obtained by the invention is substantially free of fine particles, i.e. no fine particles are added on top of the small fraction of finer particles typically included in ordinary Portland cement. The term "fine particles" is understood to comprise particles, the mean diameter D50 of which is below 2 µm. The D50 diameter corresponds to the $50^{th}$ percentile of the distribution by volume of the particle size, i.e. 50% of the volume is formed by particles having a size that is below the D50 diameter and 50% having a size that is above the D50 diameter. The term "substantially" means less than 1%, preferably less than 5%, expressed in mass in relation to the cement mass.

Cements that are less or not suitable for the realisation of the invention are calcium aluminate cements and their mixtures. Calcium aluminate cements are cements generally comprising a mineral phase C4A3$, CA, C12A7, C3A or C11A7CaF$_2$ or their mixtures, such as, e.g., Ciment Fondu® (a calcium aluminate-based hydraulic binder), alumina cements, sulfoaluminate cements and calcium aluminate cements according to the European NF EN 14647 Standard of December 2006. Such cements are characterized by an alumina (Al$_2$O$_3$) content of 35 wt.-%.

In step (i), the slurry may be prepared using mixers typically used to produce cement slurries. They may be a mixer for slurries, a mixer from a cement batching plant, a mixer described in the European NF EN 196-1 Standard of April 2006—Paragraph 4.4, or a beater with a planetary movement.

According to a first mode of operation, the cement slurry may be prepared by introducing into a mixer water, the solution of CSH crystallization seeds and optionally additives (such as a water reducer). Thereafter, the Portland cement, and optionally other pulverulent components, is added into the mixer. The paste that is obtained in this way is then mixed for obtaining the cement slurry. Preferably, the cement slurry is kept under agitation for example by means of a deflocculating paddle at a speed which may be between 1000 and 600 rpm, depending on the volume of the slurry, during the entire manufacturing process.

According to a second mode of operation, the cement slurry may be prepared by introducing a part of the water, the CSH crystallization seeds and optionally the additives (such as a water reducer) in a mixer, and then the cement and afterwards the further components.

According to a third mode of operation, the cement slurry may be prepared by introducing into a mixer the cement, and eventually all the others pulverulent components. The cement and the pulverulent components are mixed in order to obtain a homogenous mixture. Water, the CSH crystallization seeds and optionally the additives (such as a water reducer) are then introduced into the mixer.

According to a forth mode of operation, the cement slurry is prepared in a continuous way by preparing in advance a mixture containing water, CSH crystallization seeds and optionally additives (such as a water reducer).

In step (i), the aqueous foam may be produced by combining water and a foaming agent, then introducing a gas. This gas is preferably air. The foaming agent is preferably used in an amount of 0.25-5.00 wt.-%, preferably 0.75-2.50 wt.-%, (dry mass) of the mass of water.

The introduction of air may be carried out by stirring, by bubbling or by injection under pressure. Preferably, the aqueous foam may be produced using a turbulent foamer (bed of glass beads for example). This type of foamer makes it possible to introduce air under pressure into an aqueous solution comprising a foaming agent.

The aqueous foam may be generated continuously in the process according to the invention.

The generated aqueous foam has air bubbles with a D50, which is less than or equal to 400 µm, preferably comprised from 100 to 400 µm, more preferably comprised from 150 to 300 µm. Preferably, the generated aqueous foam has air bubbles with a D50 which is 250 µm.

The D50 of the bubbles is measured by back scattering. The apparatus used is the Turbiscan® Online provided by the Formulaction company. Measurements of the back scattering make it possible to estimate a D50 for the bubbles of an aqueous foam, by knowing beforehand the volume fraction of the bubbles and the refractive index of the solution of foaming agent.

Preferably, the foaming agent is an organic protein derivative of animal origin (such as, e.g., the foaming agent named Propump26, a powder of hydrolysed keratin, sold by the company Propump Engineering Ltd) or of vegetable origin. The foaming agents may also be a cationic surfactant (for example cetyltrimethylammonium bromide, CTAB), an ionic surfactant, an amphoteric surfactant (for example cocamidopropyl betaine, CAPB), or a nonionic surfactant, or mixtures thereof.

In step (ii), the cement slurry may be homogenized with the aqueous foam by any means to obtain a slurry of foamed cement. Preferably, step (ii) of the process according to the invention may comprise the introduction of the cement slurry and the aqueous foam into a static mixer to obtain a slurry of foamed cement.

The suitable static mixers preferably have elements in the form of a propeller to ensure complete radial mixing and successive divisions of the flow for each combination of liquids and gas. The suitable static mixers according to the invention preferably have helical elements which transmit a radial speed to the fluid, which is directed alternatively towards the side of the mixer, then towards its centre. The successive combinations of elements directing the flow clockwise and counter clockwise provoke a change of direction and a division of the flow. These two combined actions increase the efficiency of the mixing. Preferably, the static mixer used in the process according to the invention is a mixer operating by dividing the continuous flow of cement slurry and of aqueous foam. The homogeneity of the mix is based on the number of divisions. According to the process of the invention, 16 elements are preferably used to ensure good homogeneity. The suitable static mixers according to the process of the invention are preferably those commercialised under the brand name of Kenics®.

According to a more particular embodiment, the cement slurry is pumped at a precise volume flow, which is a function of the target composition of foamed cement slurry. Then, this cement slurry is combined with the aqueous foam already circulating in the circuit of the process. The slurry of foamed cement according to the invention is thus generated. This slurry of foamed cement is cast and left to set.

Advantageously, the inventive process does not need neither an autoclave step, nor a thermal treatment step (for example at 60-80° C.) in order to obtain a cement foam according to the invention.

The invention also relates to a slurry of foamed cement as obtained in step (ii) of the process of the invention.

Further, the invention also relates to a mineral foam obtained according to the process of the invention.

Further, the invention also relates to a mineral foam obtainable according to the process of the invention.

The mineral foam of the invention may be prefabricated. The mineral foam according to the invention may also be directly prepared on the jobsite by installing a foaming system on the jobsite.

Preferably, the mineral foam according to the invention may have a density of 20 to 300 kg/m$^3$, more preferably from 20 to 150 kg/m$^3$, most preferably from 30 to 80 kg/m$^3$. Even more preferably the mineral foam according to the invention may have a density of 20 to 70 kg/m$^3$, more preferably 20 to 60 kg/m$^3$, most preferably 20 to 50 kg/m$^3$. It is to be noted that the density of the slurry of foamed cement (humid density) is different to the density of the mineral foam (density of the hardened material).

The invention provides another advantage in that the mineral foam according to the invention has excellent thermal properties, and in particular very low thermal conductivity. Thermal conductivity (also called lambda ($\lambda$)) is a physical value characterizing the behaviour of materials during the transfer of heat by conduction. Thermal conductivity represents the quantity of heat transferred per unit of surface and per unit of time submitted to a gradient of temperature. In the international system of units, thermal conductivity is expressed in watts per metre Kelvin (W/m·K). Typical or conventional concretes have thermal conductivity values measured at 23° C. and 50% relative humidity of 1.3 to 2.1. The thermal conductivity of the mineral foam according to the invention may be from 0.030 to 0.150 W/m·K, preferably from 0.030 to 0.060 W/m·K, more preferably from 0.030 to 0.055 W/m·K, the margin of error being ±0.4 mW/m·K.

Preferably, the mineral foam according to the invention has a very good fire resistance.

The mineral foam according to the invention may be a concrete, which is pre-cast on the jobsite, a ready-mix concrete or a concrete produced at a production plant of pre-cast elements. Preferably, the mineral foam according to the invention is a ready-mix concrete.

The invention also relates to an element of construction comprising the mineral foam according to the invention.

The invention also relates to the use of the mineral foam according to the invention as construction material.

The mineral foam according to the invention may be used to cast walls, ceilings and roofs during a jobsite. It is also possible to realise prefabricated elements in a prefabrication plant, such as blocs or panels.

The invention also relates to the use of the mineral foam according to the invention as insulating material.

Advantageously, the mineral foam according to the invention makes it possible in certain cases to replace glass wool, mineral wool or polystyrene insulating material.

Advantageously, the mineral foam according to the invention may be used to fill empty or hollow spaces in a building, a wall, a partition wall, a brick, a floor or a ceiling. In this case, it is used as a filling compound. Such composite construction elements also constitute objects of the invention per se.

Advantageously, the mineral foam according to the invention may be used as facade lining to insulate a building from the outside. In this case, the mineral foam according to the invention may be coated by a finishing compound.

The invention also relates to a system comprising the mineral foam according to the invention. The mineral foam may be present in the system, for example as insulating material. The system according to the invention is a system capable of resisting to transfers of air and to thermohydric transfers, which is to say that this element has controlled permeability to transfers of air or water in the vapour or liquid form.

The system according to the invention, which resists to transfers of air and to thermohydric transfers in the construction field, comprises at least a framework. This framework may be secondary or primary. This framework may be of concrete (stud or beam), metal (support or beam), wood, plastics, composite material or a synthetic material. This framework may be a metal structure, a stud or a rail.

The system according to the invention may be used to produce a lining, an insulation system or a partition wall, for example a separation partition wall, a distribution partition wall or an inner partition.

The mineral foam according to the invention may be used to fill hollow parts of building blocs, such as cavity bricks. The foam may be filled into the cavity at any production step of the building bloc.

The mineral foam according to the invention may be cast vertically between two walls, for example between two concrete walls, two brick walls, two plaster boards, two wood walls, to obtain a system.

The invention will now be described by reference to the following non limitative examples.

The following measuring methods were used:

Laser Granulometry Method

In this specification, including the accompanying claims, particle size distributions and particle sizes are as measured using a laser granulometer of the type Mastersize 2000 (year 2008, series MAL1020429) sold by the company Malvern.

Measurement is effected in an appropriate medium (for example an aqueous medium for non-reactive particles, or alcohol for reactive material) in order to disperse the particles. The particle size shall be in the range of 1 µm to 2 mm. The light source consists of a red He—Ne laser (632 nm) and a blue diode (466 nm). The optical model is that of Frauenhofer and the calculation matrix is of the polydisperse type. A background noise measurement is effected with a pump speed of 2000 rpm, a stirrer speed of 800 rpm and a noise measurement for 10 s, in absence of ultrasound. It is verified that the luminous intensity of the laser is at least equal to 80% and that an decreasing exponential curve is obtained for the background noise. If this is not the case, the cell's lenses have to be cleaned.

Subsequently, a first measurement is performed on the sample with the following parameters: pump speed 2000 rpm and stirrer speed 800 rpm. The sample is introduced in order to establish an obscuration between 10 and 20%. After stabilisation of the obscuration, the measurement is effected with a duration between the immersion and the measurement being fixed to 10 s. The duration of the measurement is 30 s (30000 analysed diffraction images). In the obtained granulogram one has to take into account that a portion of the powder may be agglomerated.

Subsequently, a second measurement is effected (without emptying the receptacle) with ultrasound. The pump speed is set to 2500 rpm, the stirrer speed is set to 1000 rpm, the ultrasound is emitted at 100% (30 watts). This setting is maintained for 3 minutes, afterwards the initial settings are resumed: pump speed at 2000 rpm, stirrer speed at 800 rpm, no ultrasound. At the end of 10 s (for possible air bubbles to clear), a measurement is carried out for 30 s (30000 analysed images). This second measurement corresponds to a powder desagglomerated by an ultrasonic dispersion.

Each measurement is repeated at least twice to verify the stability of the result.

Measurement of the Specific BLAINE Surface

The specific surface of the various materials is measured as follows. The Blaine method is used at a temperature of 20° C. with a relative humidity not exceeding 65%, wherein a Blaine apparatus Euromatest Sintco conforming to the European Standard EN 196-6 is used.

Prior to the measurement the humid samples are dried in a drying chamber to obtain a constant mass at a temperature of 50-150° C. The dried product is then ground in order to obtain a powder having a maximum particle size of less than or equal to 80 µm.

EXAMPLES

The method according to the invention was used in order to produce mineral foams B, C, E, F and H starting from cement slurries with the slurry formulations II, III, IV, VI and VIII and from aqueous foam 1 and 2. Comparative examples have also been realized, namely the mineral foams A, D and G starting from the cement slurries with the slurry formulations I, IV and VII, in order to illustrate the advantageous aspects of the invention.

Materials Used:

The cements are Portland cements originating from different Lafarge cement productions sites, as indicated in Table 1. These cements are standard type cements. The letters "R" and "N" correspond to the definition given in the European NF EN 197-1 Standard, version April 2012.

The plasticizer is a mixture comprising a polycarboxylate polyoxide (PCP) from the Chryso company under the brand name of Chrysolab EPB 530-017, which does not comprise an anti-foaming agent. The solids content of Chrysolab EPB 530-017 is 48 wt.-%

The foaming agents used are the following derivative proteins of animal origin:

Propump 26 obtained from the company Propump Engineering Ltd having a solids content of 26 wt.-%

MAPEAIR L/LA obtained for the company MAPEI, having a solids content of 26 wt.-%.

The different CSH seeds used in the examples are produced by following the protocols described above:
CSH seed (solids content=20.5%)
Sludge (solids content=19.5%)
Hydrated paste (solids content=16.6%)
Water: Tap Water.
Equipment Used:
The Rayneri Mixer:
  A Turbotest mixer (MEXP-101, model: Turbotest 33/300, Serial N°: 123861) supplied by the company Rayneri, which is a mixer with a vertical axis.
Pumps:
  A pump having an eccentric screw conveyer Seepex™ of the type MD 006-24, commission no. 244920.
  A pump having an eccentric screw conveyer Seepex™ of the type MD 006-24, commission no. 278702.
Foamer:
  A foamer comprising a bed of glass beads of the type SB30 having a diameter of 0.8-1.4 mm filled up in a tube having a length of 100 mm and a diameter of 12 mm.
Static Mixer:
  A static mixer comprised of 32 helicoidal elements of the type Kenics having a diameter of 19 mm and referred to as 16La632 at ISOJET.

In the following examples, 8 mineral foams were produced. Each cement slurry is referred to by the numbers I to VIII and each aqueous foam is referred to by the number 1 or 2. The cement foam (mineral foam) as obtained is a combination of one of the cement slurries with one of the aqueous foams.

Preparation of Cement Slurry

TABLE 1

Slurry formulations

| | I | II | III | IV | V | VI | VII | VIII |
|---|---|---|---|---|---|---|---|---|
| Cemen type | CEM I 52, 5N | CEM I 52, 5N | CEM I 52, 5N | CEM I 52, 5N | CEM I 52, 5N | CEM I 52, 5N | CEM I 52, 5N | CEM I 52, 5N |
| Lafarge plant | Le Havre | Le Havre | Le Havre | Saint Pierre La Cour | Saint Pierre La Cour | Saint Pierre La Cour | Val d' Azergues | Val d' Azergues |
| Water/Cement (w/w) | 0.29 | 0.29 | 0.29 | 0.29 | 0.29 | 0.29 | 0.29 | 0.29 |
| X (% Na2O eq soluble) | 0.22 | 0.22 | 0.22 | 0.66 | 0.66 | 0.66 | 0.40 | 0.40 |
| Cement (dry wt %) | 77.45 | 76.86 | 76.85 | 77.40 | 74.52 | 76.81 | 77.44 | 76.83 |
| Ca Carbonate | — | — | — | — | — | — | — | — |
| Water (wt %) | 22.46 | 19.24 | 18.36 | 22.35 | 6.03 | 19.18 | 22.36 | 19.21 |
| Super-plasticiser (wt %) | 0.17 | 0.13 | 0.17 | 0.26 | 0.25 | 0.24 | 0.20 | 0.19 |
| CSH (wt %) | 3.77 | — | — | — | — | 3.76 | — | 3.77 |
| Sedimentation sludge (wt %) | — | — | — | — | 19.2 | — | — | — |
| Hydrated paste (wt %) | — | — | 4.63 | — | — | — | — | — |
| % CSH/cement | | 1.00 | 1.00 | | 5.00 | 1.00 | | 1.00 |

The chemical composition of the various cement slurries used for carrying out the invention are presented in Table 1. The cement slurries have ben prepared by using the mixer Rayneri Turbotest 33/300, into which the liquid components (water, super-plasticiser, CSH crystallization seeds) have first been introduced. While mixing at 1000 rpm, the solid components (cement and all pulverulent components) have progressively been added. The cement slurry was then mixed for two additional minutes.

Preparation of the Aqueous Foam

An aqueous solution containing the foaming agent has been introduced into a receptacle. The composition of this aqueous solution of foaming agent (in particular the concentration and the nature of the foaming agent) is reported in Table 2. The aqueous solution of the foaming agent was pumped by means of a volumetric pump having an eccentric screw conveyor Seed TM MD-006-24 (commission no: 278702).

This foaming agent solution was introduced into the foamer through the bed of beads by means of pressurized air (1-6 bar) and a T-junction. The aqueous foam was produced in a continuous way at a rate as indicated in Table 2.

TABLE 2

| | 1 | 2 |
|---|---|---|
| Foaming agent | Propump26 | MapeAIR L/LA |
| Concentration (% liquid/water) | 3.5 | 2.5 |
| Concentration (% dry/water) | 0.91 | 0.65 |
| Rate, Air (L/min) | 8 | 8 |
| Rate, Solution (L/min) | 0.41 | 0.41 |

Preparation of a Slurry of Foamed Cement

The cement slurries as previously obtained have been poured into the mixing receptacle while mixing (400 rpm). The cement slurry was pumped by means of a volumetric pump having an eccentric screw conveyer Seepex™ MD 006-24 (commission no: 244920) at a rate of 0.25 L/min.

The pumped slurry and the aqueous foam, continuously prepared, have been brought into contact with each other in a static mixer and a slurry of foamed cement was obtained.

Preparation of a Mineral Foam

The slurry of foamed cement was poured into cubes of polystyrene having a dimension of 10×10×10 cm and into cylindrical columns having a height of 2.50 m and a diameter of 20 cm. Three cubes have been realized for each slurry of foamed cement. The cubes have been demoulded after 1 day and stored 7 days at a relative humidity of 100% and a temperature of 20° C. The cubes have then been dried at a temperature of 45° C. until a constant mass is obtained. A column has been realized for certain slurries of foamed cement. The columns have been demoulded after 3 to 7 days and then cut in sections having a length of 25 cm. The sections have been dried until a constant mass is obtained.

Analysis of the Mineral Foams

The stability of the foams has been measured by visual inspection of the cubes before demoulding. A foam has been described as "stable", if the cube kept its height of 10 cm after setting. A foam has been described as "unstable", if the cube has collapseed during its setting. Each test was carried out on 3 cubes of 10×10×10 cm. The results show a similar performance among the 3 cubes. As the case may be, the results are the mean value of 3 cubes.

A column has been considered stable if the density between the lower section and the upper section does not differ by more than 5 kg/m.

Thermal Conductivity of the Mineral Foams

The thermal conductivity has been measured by means of an apparatus for measuring thermal conductivity: CT-meter supplied by the company Alphis-ERE (Resistance 5Ω, sensor wire 50 mm. The measurements have been carried out on dry samples at a temperature of 45° C. until a constant mass is obtained. The sample is then cut in two equal pieces by means of a saw. The measuring sensor was placed between the two surfaces of the sample halves (on the side of the sawing). The heat was transferred from the source to the thermo element through the material that surrounds the sensor; the temperature raise of the thermo element was measured as a function of time, which allowed to calculate the thermal conductivity of the sample.

Density of the Mineral Foams

The humid density of the cement slurry was measured by weighing the cubes at the time of casting.

The dry density of the samples was measured on dried samples at a temperature of 45° C. until a constant mass was obtained, while pressing the cubes.

The Results

The results are presented in Table 3.

Furthermore, comparing foams D and E, and the foams G and H, made from slurries where the only variable is the presence of CSH seeds, shows their role to generating a stable mineral foam.

The invention claimed is:

1. A process for the production of a mineral foam comprising the following steps:
   (i) separately preparing a slurry of cement and an aqueous foam, wherein the cement slurry comprises water and Portland cement as well as calcium silicate hydrate crystallization seeds;
   (ii) contacting the slurry of cement with the aqueous foam to obtain a slurry of foamed cement;
   (iii) casting the slurry of foamed cement and leave it to set, wherein no fine particle addition having a D50<2 μm is introduced to obtain the mineral foam such that the mineral foam obtained is substantially free of fine particles, wherein the slurry of foamed cement is obtained without using a calcium aluminate cement.

2. The process according to claim 1, wherein the calcium silicate hydrate crystallization seeds comprise calcium silicate hydrate particles.

3. The process according to claim 1, wherein the calcium silicate hydrate crystallization seeds are present in the form of an aqueous suspension.

4. The process according to claim 1, wherein the calcium silicate hydrate crystallisation seeds are present in an amount of 0.5-7% in dry calcium silicate hydrate by weight of Portland cement.

5. The process according to claim 1, wherein the D50 of bubbles of the aqueous foam prepared in step (i) is less than or equal to 400 μm.

6. The process according to claim 1, wherein step (ii) comprises the introduction of the slurry of cement and the aqueous foam into a static mixer to obtain the slurry of foamed cement.

7. The process according to claim 1, wherein a W/C ratio (wt/wt ratio) of 0.28-0.35 is used in step (i).

TABLE 3

| Mineral foam | A | B | C | D | E | F | G | H |
|---|---|---|---|---|---|---|---|---|
| Aqueous foam | 2 | 2 | 2 | 2 | 2 | 2 | 1 | 1 |
| Slurry formulation | I | II | III | IV | V | VI | VII | VIII |
| Density of mineral foam, humid (g/L) | 110 | 114 | 113 | 106 | 113 | 109 | 110 | 110 |
| Density of mineral foam, dry (g/L) | 72 | 73 | 69 | nm | 65 | 64 | — | 68 |
| Stability (cube) | Stable | Stable | Stable | unstable | Stable | Stable | unstable | Stable |
| Size of bubbles (mm) | >2 | 1 < x < 2 | 1 < x < 2 | — | 1 < x < 3 | 1 < x < 2 | — | 1 < x < 2 |
| Stability (column 16*32) | nm | Stable | nm | — | nm | Stable | — | nm |
| Lambda (W/k · m) | 0.043 | nm | 0.041 | — | nm | nm | — | nm | nm not measured
unstable means that the foam collapsed

The results show that all foams made from cement slurries that contain CSH crystallization seeds (II, III, V, VI and VIII) are stable.

Furthermore, these stable foams have a reduced average diameter of their air bubbles, which is known to be associated with increased stability of the foam.

8. The process according to claim 1, wherein the Portland cement is a cement of the type CEM I, CEM II, CEM III, CEM IV or CEM V.

9. The process according to claim 1, wherein the Portland cement has a specific surface (Blaine) of 3000-10000 $cm^2/g$.

10. The process according to claim 1, wherein the cement slurry comprises a water reducer.

11. The process according to claim 1, wherein the slurry of foamed cement comprises at least one supplementary mineral component.

12. A method comprising utilizing calcium silicate hydrate crystallization seeds for enhancing the mechanical stability and/or reducing the collapse of a slurry of foamed cement, said slurry of foamed cement being obtained by
  (i) separately preparing a slurry of cement and an aqueous foam, wherein the cement slurry comprises water and Portland cement as well as calcium silicate hydrate crystallization seeds; and
  (ii) contacting the slurry of cement with the aqueous foam to obtain the slurry of foamed cement,
  wherein no fine particle addition having a D50<2 μm is introduced to obtain the slurry of foamed cement such that the slurry of foamed cement obtained is substantially free of fine particles, wherein the slurry of foamed cement is obtained without using a calcium aluminate cement.

13. The method according to claim 12, wherein the calcium silicate hydrate crystallisation seeds are present in an amount of 0.5-7% in dry calcium silicate hydrate by weight of Portland cement.

14. The process according to claim 4, wherein the calcium silicate hydrate crystallisation seeds are present in an amount of 0.5-5% in dry calcium silicate hydrate by weight of Portland cement.

15. The process according to claim 14, wherein the calcium silicate hydrate crystallisation seeds are present in an amount of 0.7-3% in dry calcium silicate hydrate by weight of Portland cement.

16. The process according to claim 9, wherein the Portland cement has a specific surface (Blaine) of 3500-6000 $cm^2/g$.

17. The process according to claim 10, wherein the water reducer is a plasticiser or super-plasticiser.

18. The process according to claim 11, wherein the at least one supplementary mineral component is a supplementary cementitious material.

19. The process according to claim 11, wherein the at least one supplementary mineral component is selected from calcium carbonate, silica, ground glass, solid or hollow glass beads, glass granules, expanded glass powders, silica aerogels, silica fume, granulated blast furnace slags, ground sedimentary siliceous sands, fly ash or pozzolanic materials or mixtures thereof.

20. The method according to claim 13, wherein the calcium silicate hydrate crystallisation seeds are present in an amount of 0.5-5% in dry calcium silicate hydrate by weight of Portland cement.

21. The method according to claim 20, wherein the calcium silicate hydrate crystallisation seeds are present in an amount of 0.7-3% in dry calcium silicate hydrate by weight of Portland cement.

* * * * *